United States Patent [19]

Pröll

[11] Patent Number: 4,960,374
[45] Date of Patent: * Oct. 2, 1990

[54] APPARATUS FOR MOLDING OUTER AND INNER SOLES AND A SOLE WELT ONTO SHOE UPPERS

[75] Inventor: Manfred Pröll, Achim-Baden, Fed. Rep. of Germany

[73] Assignee: Klöckner Ferromatik Desma GmbH, Fed. Rep. of Germany

[*] Notice: The portion of the term of this patent subsequent to Mar. 7, 2006 has been disclaimed.

[21] Appl. No.: 340,270

[22] Filed: Apr. 19, 1989

[30] Foreign Application Priority Data

Apr. 26, 1988 [DE] Fed. Rep. of Germany ....... 3813993

[51] Int. Cl.$^5$ .............................................. B29C 45/16
[52] U.S. Cl. .................. 425/119; 425/129.2; 425/576; 264/244
[58] Field of Search ............. 264/244; 425/119, 129.2, 425/576

[56] References Cited

U.S. PATENT DOCUMENTS

| | | | |
|---|---|---|---|
| 3,444,590 | 5/1969 | Ludwig | 425/119 |
| 3,671,621 | 6/1972 | Fukuoka | 264/244 |
| 4,090,831 | 5/1978 | Hujik | 425/119 |
| 4,276,254 | 6/1981 | Combronde | 425/129.2 |
| 4,810,178 | 3/1989 | Proll et al. | 425/119 |
| 4,854,841 | 8/1989 | Graf et al. | 425/119 |

FOREIGN PATENT DOCUMENTS 3600682 6/1987 Fed. Rep. of Germany .

Primary Examiner—David Simmons
Assistant Examiner—Allan R. Kuhns
Attorney, Agent, or Firm—Watson, Cole, Grindle & Watson

[57] ABSTRACT

Outer and inner soles and a sole welt are molded onto shoe uppers. A molded outer sole is formed by injection molding plasticized thermoplastic material into a first mold cavity defined by a first mold part at an end of a pivotable mold carrier and a confronting mold plate. A molded sole welt closed on itself is formed on a last supported shoe upper by injection molding plasticized thermoplastic material into a sole welt mold cavity defined by an opposed pair of first lateral mold elements closed against the shoe upper while a second mold part at an opposite end of the mold carrier confronts the shoe upper and the lateral mold elements. The mold carrier is shifted away from the lateral mold elements and pivoted to confront the first mold part and the molded outer sole to the shoe upper. An inner sole mold cavity is formed with the molded outer sole by closing an opposed pair of second lateral mold elements located between the first lateral elements and the first mold part. A molded inner sole is formed by injection molding foamed plasticized thermoplastic material into the inner sole mold cavity. The molded outer sole may be formed by separately injection molding plasticized thermoplastic material into portions of the first mold cavity during first and second steps of the first molding cycle.

2 Claims, 2 Drawing Sheets

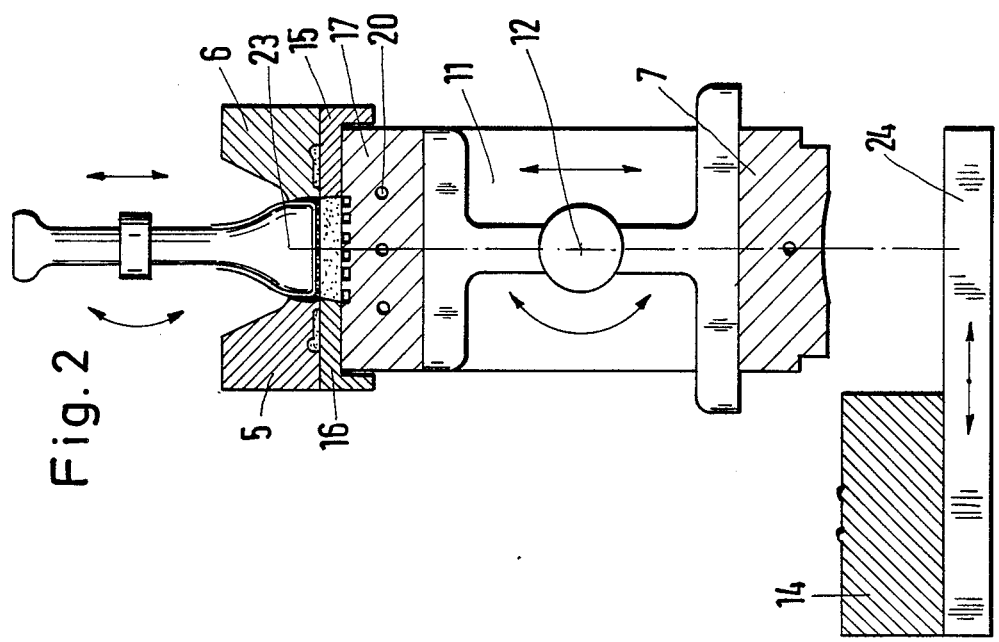
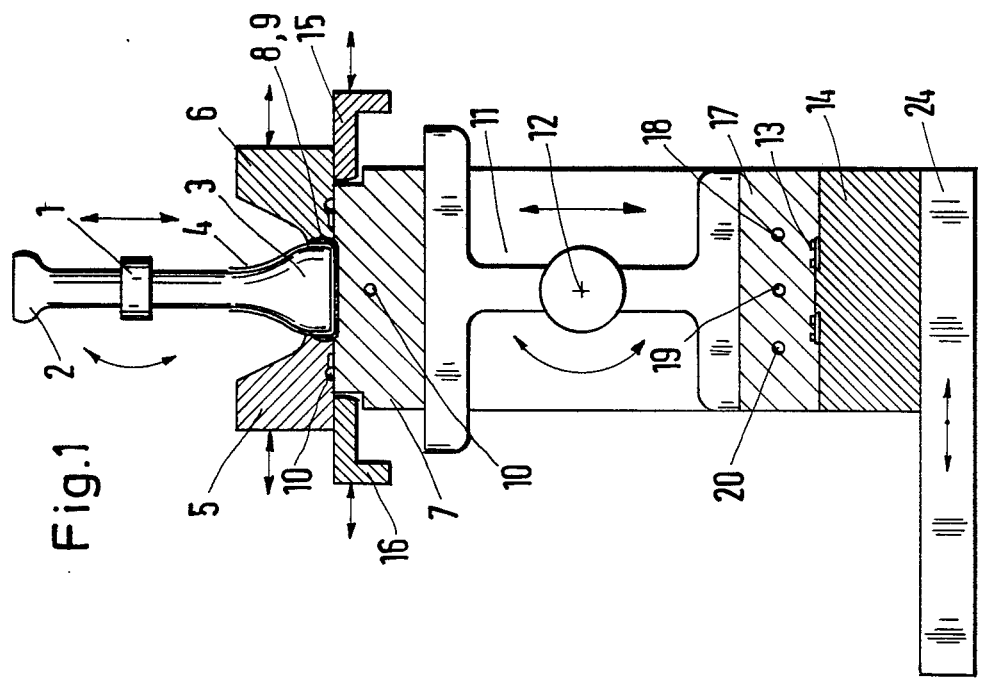

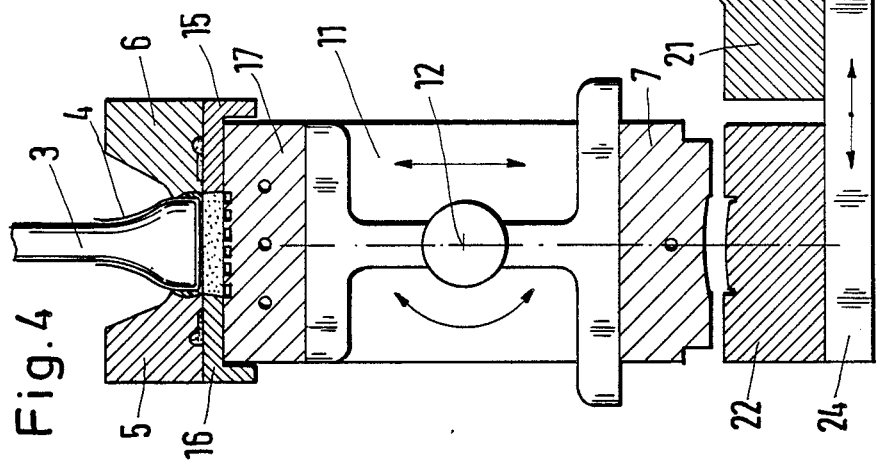
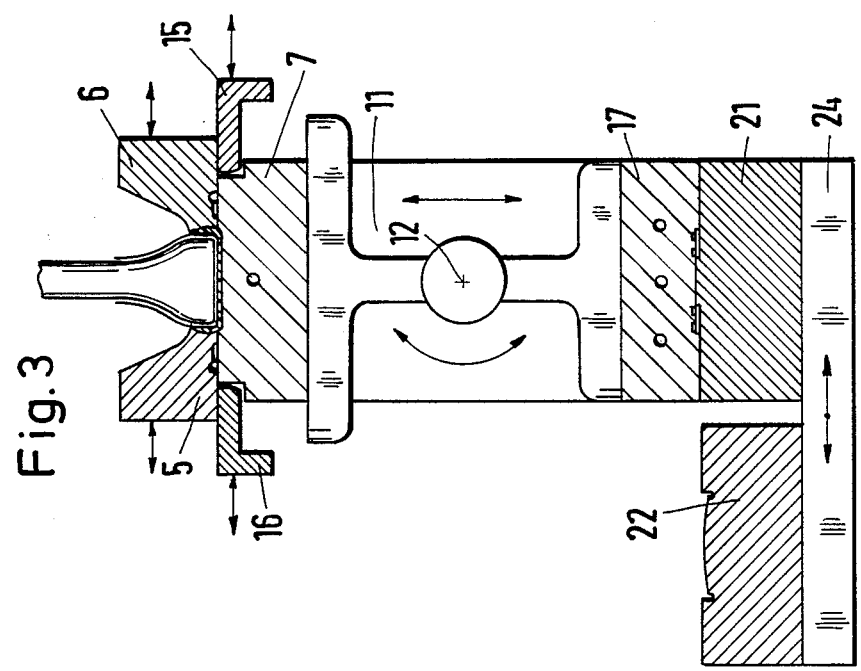

… … … … … … … … … …

APPARATUS FOR MOLDING OUTER AND INNER SOLES AND A SOLE WELT ONTO SHOE UPPERS

BACKGROUND OF THE INVENTION

This invention relates to a process and apparatus for molding outer and inner soles and a sole welt of thermoplastic material on to shoe uppers.

Generally soles of thermoPlastic material molded to shoe uppers have a non-abrasive outer sole and an inner sole of foamed material having high elasticity yet low abrasion resistance and interposed between the outer sole and the shoe upper.

The molding operation can be carried out using a circular turntable installation having a plurality of molding stations.

Generally the molding apparatus comprises a pair of lateral side mold parts, a bottom punch, a counter punch and a last supported shoe upper to facilitate the molding of first the inner sole and then the outer sole.

To form the outer sole, the side parts, the bottom punch and the counter punch define a mold cavity with a volume corresponding to the volume of the outer sole to be formed. The two side parts of the molding apparatus define in their closed position a feed channel by means of which the plasticized thermoplastic material is injected to form the outer sole. Then the counter punch is removed and the last supported shoe upper is slid on the side parts for forming a mold cavity for the inner sole. When removing the counter punch an infeed gate is released through which the foamed plasticized material is injected to form the inner sole.

Otherwise the inner sole may be injection molded first followed by injection molding of the outer sole such that the material for the inner sole is first injected into an intermediate space formed by the side parts, the bottom punch and the shoe last which is slid with the shoe upper mounted on the side parts, by means of an infeed gate also defined by the two side parts of the mold. After the inner sole is formed, the bottom punch is lowered, forming another mold cavity and the material for the outer sole is injected through another infeed gate, released by the bottom punch.

West German patent No. 36 00 682 discloses molding apparatus having at least one last supported shoe upper and a pivotable mold carrier supporting two pairs of opposed bottom mold parts, and a confronting mold plate formed as a counter punch and a pair of transversely movable side molds for forming molded soles such as outer soles of an elastomer and an inner sole of a mixture of isocyanate and a polyol which completely reacts into polyurethane. A pivotable last rotary head has a pair of oppositely extending lasts for supporting the shoe uppers.

The bottom mold part of the pivotable mold carrier interacts in successive work cycles with an injection mold for forming an outer sole. One of the bottom mold parts containing a formed outer sole forms together with the laterally movable side mold elements a mold cavity for forming the inner sole. The apparatus is especially utilized for molding shoe soles with an elastomeric outer sole and a foamed polyurethane inner sole.

Known leather shoes with an inner sole and a leather outer sole generally have a peripheral continuous edge laterally extending above the base of the shoe upper, and has a peripheral, continuous sole welt cemented or sewn in place.

For leather shoes this self-contained sole welt has an aesthetic function and for sport shoes, it has, for example, a double seam.

In shoes having pointed soles of thermoplastic material the shoe upper has a tendency to shear relative to the outer sole as caused by the low lateral stability of the foamed inner sole which is of a very soft material for cushioning.

For molded soles this lateral stability can be significantly improved if the shoe uppers have continuous sole welts, i.e., welts closed upon themselves.

SUMMARY OF THE INVENTION

It is therefore an object of the present invention to Provide for the improvement of the lateral stability of shoes having molded shoe soles of thermoplastic material in which the molded soles have an outer sole and a foamed inner sole.

According to the invention the outer sole is formed during a first molding cycle of a pivotable mold carrier, and a sole welt which is closed upon itself is molded to a last supported shoe upper. During a second molding cycle of the carrier an inner sole is molded to the shoe upper between the outer sole, the shoe upper and the sole welt.

It can be shown that the lateral stability of a shoe made according to this process is significantly improved. For the sole welts, for example, a rigid plasticized thermoplastic material, such as 70° to 75° Shore, is used so that in the region of the sole, the shoe upper has a rigid elastic border, which at the bottom or inner sole of the shoe upper is also connected to the foamed inner sole. Since the contour of the adjacent area of the sole welt and the underside of the shoe upper is different from the contour of the area of the outer sole that is adjacent to the inner sole, a laterally stable connection will be provided.

The outer sole can be injection molded as a continuous sole. Otherwise the outer sole can be divided into two or more Portions or sections. For this purpose the invention includes molding an outer sole subdivided into portions or areas during a subdivided (at least two) first molding cycle such that first and second portions are separately molded in first and second steps through inlet feed channels provided for this purpose. During the second step the sole welt to be closed upon itself can be molded to the shoe upper so that at the end of the first molding cycle the plasticized thermoplastic material is injected into the cavity of the mold for the outer sole and into the cavity of the mold for the shoe welt closed on itself so that the chemical reactions proceed to the same degree in the outer sole and the sole welt, and the inner sole is molded without difficulty and is connected to the outer sole, to the welt and to the shoe upper during the second molding cycle.

If the outer sole is a continuous sole, i.e., not divided into portions or areas, the apparatus of the invention has at least one last supported shoe upper, a pivotable mold carrier having first and second opposing mold parts, at least one mold plate confronting the first mold part and a pair of laterally movable side mold elements for defining a sole welt cavity. The apparatus further has another pair of laterally movable side mold elements underlying the first pair such that during a first molding cycle the side elements together with the last supported shoe upper and the second mold part define a cavity for the shoe welt to be closed on itself. And, the first mold part and its confronting mold plate define an outer sole cavity such that during a second molding cycle the last supported shoe upper, the sole welt closed on itself and the closed other pair of lateral side mold elements together with the molded outer sole define the inner sole cavity.

For dividing the outer sole into several areas or portions according to another embodiment of the invention, the apparatus has first and second transversely movable mold plates alternately confronting the first mold part in the first molding cycle such that the confronting mold plates respectively define together with the first mold part first and second portions of an outer sole mold cavity into which plasticized thermoplastic materials are separately injected for molding the outer sole.

DESCRIPTION OF THE DRAWINGS

FIGS. 1 and 2 are schematic, elevational views, partly in section, of the molding apparatus according to one embodiment of the invention showing the first and second molding cycles respectively; and FIGS. 3 and 4 are views similar to FIGS. 1 and 2 of another embodiment of the invention.

DETAILED DESCRIPTION OF THE INVENTION

The molding apparatus of FIGS. 1 and 2 is located at a predetermined molding station of a turntable molding installation (not shown) for molding the sole with a continuous outer sole.

The shoe last rotary head 1 has a pair of oppositely extending shoe lasts 2 and 3 of known construction, the head being pivotable about an axis perpendicular to the plane of the paper in the direction of the curved double arrow shown associated therewith. A shoe upper is supported on shoe last 3, while a finished shoe (not shown) has been removed from shoe last 2.

The shoe last rotary head is also axially movable in the direction of the straight double arrow associated therewith. A first pair of laterally movable side mold elements 5 and 6 are movable in the direction of the double arrows associated therewith into the closed position shown in FIG. 1 against the last supported shoe upper, and are movable into an open position (not shown). A mold part in the form of a bottom stamp 7 has a material infeed gate 10, and further infeed gates 10 between elements 5, 6 and mold part 7 are provided for injection molding a sole welt 9 to the shoe upper such that the welt is continuous an uninterrupted, i.e., closed upon itself. A shoe welt mold cavity 8 is formed between mold elements 5 and 6 and the last supported shoe upper, and by mold part 7, into which plasticized thermoplastic material is injected to form the sole welt.

Bottom punch 7 is mounted on a pivotable mold carrier 11 located at the predetermined molding station and is therefore part of the turntable installation. The mold carrier is pivotable about its central axis 12 in both directions shown by the double curved arrow associated therewith, and is likewise vertically movable in the direction shown by the straight double arrow associated therewith. Mounted on an opposite side of the mold carrier is another bottom punch 17 in the form of a mold part having a mold cavity 13 which is continuous and is closed by a counter punch 14 in the form of a mold plate mounted on support 24 for lateral movement, in both directions of the double straight arrow shown associated therewith. Mold part 17 has material infeed gates 18, 19 and 20 which lead to mold cavity 13 through which plasticized thermoplastic material is injected for forming the outer sole.

Another pair of laterally movable side mold elements 15 and 16 are provided for movement in the direction of the double arrows shown associated therewith between the open position shown in FIG. 1 and the closed position shown in FIG. 2. These side mold elements 15, 16 underlie side mold elements 5 and 6 as shown.

In operation, plasticized thermoplastic material is injected through gates 18, 19 and 20 into mold cavity 13 for forming a molded outer sole in the first cycle of operation of FIG. 1. At the same time plasticized thermoplastic material is injected through infeed gates 10 into sole welt mold cavity 8 to form a continuous sole welt during the first cycle of operation of FIG. 1. The sole welt 9, which is closed on itself, is molded to the shoe upper after which mold plate 14 is moved to its FIG. 2 position, and the mold carrier is shifted away from elements 5, 6 and the last supported shoe upper with the welt molded thereon a sufficient distance to enable the mold carrier to pivot about its central axis 12 to the FIG. 2 position in which mold part 17 which supports the molded outer sole confronts the last supported shoe upper and underlies the closed side mold elements 15, 16. During this second cycle of operation mold part 7 faces downwardly. An inner sole mold cavity is formed by the closed side mold elements 15, 16, the molded outer sole supported in its cavity 13, and the last supported shoe upper having welt 9 molded thereon. During the FIG. 2 second cycle of operation plasticized and foamed thermoplastic material is injected into this cavity through infeed gate 23 forming an inner sole illustrated by the stipling in FIG. 2.

Following the molding of the shoe sole, side mold elements 5 and 6, side mold elements 15 and 16, the mold carrier and the last rotary head are moved into their open portions. The mold carrier and the last rotary head are rotated such that bottom punch 17 again confronts counter punch 14, and bottom punch 7 confronts another shoe upper supported on last 2 which is appropriately rotated into position (not shown).

Side elements 5, 6 are then moved to their closed position to facilitate molding during the FIG. 1 first cycle of operation, whereafter another second cycle of operation proceeds shown in FIG. 2.

Another embodiment of the apparatus shown in FIGS. 3 and 4 has elements substantially the same as that described in FIGS. 1 and 2, except that the apparatus of FIGS. 3, 4 is designed to form outsoles subdivided into portions or areas such that first and second portions are molded respectively in first and second steps of the first molding cycle. Thus, at the end of the first molding cycle the outer sole, divided into portions, and the self-contained sole welt, are molded. For carrying out a subdivided molding of the outer soles, the apparatus shown by the FIGS. 3, 4 embodiment has a counter punch or mold plate 21 which may be similar to that of mold plate 14 of the FIGS. 1, 2 embodiment in that a mold cavity is defined between mold part 17 and mold plate 21. However, this mold cavity is not a full mold cavity as in FIGS. 1, 2, but rather a subdivision of a full mold cavity such that it defines a given section or portion of that mold cavity.

Another counter punch or mold plate 22 is provided for the FIGS. 3, 4 embodiment which, together with mold plate 21 is mounted on a support 24 capable of being laterally shifted in the directions of the straight double arrow shown associated therewith. Thus, mold plate 22 may be shifted to confront mold Part 17 in a second step of the first molding cycle of FIG. 3. It should be pointed out that the shifted mold plate 22 is actually illustrated in FIG. 4 for the purpose of clarity, although the mold plate 22 is actually shifted during the first cycle of operation of FIG. 3.

When mold plate 22 is shifted to confront mold part 17 in the second step of the first molding cycle, 17 and 22 together define a subdivided outer sole mold cavity for the remaining portion or section of the outer sole to be molded.

In operation, the outer sole is molded in steps during the first molding cycle. Thus, mold plate 21 is disposed to confront mold part 17 such that the subdivided mold cavity defined therebetween is filled with plasticized thermoplastic material through infeed gate 19. During the second step of the first cycle, mold part 22 is shifted to confront mold part 17 such that the subdivided mold cavity defined therebetween is filled with plasticized thermoplastic material through infeed gates 18 and 20. During this second step of the first cycle, plasticized thermoplastic material is injected into the sole welt mold cavity 8 for forming the sole welt closed on itself so that the chemical reactions proceed to the same degree in the outer sole and in the sole welt. The continued operation of the first molding cycle is thus the same as that of FIG. 1, and the continued operation of the second molding cycle for molding the inner sole is the same as that of FIG. 2, shown in FIG. 4.

What is claimed is:

1. An apparatus for molding outer and inner soles and a sole welt on to shoe uppers, comprising a pivotable mold carrier having opposed sides, a first mold part mounted on one of said sides and a second mold part mounted on the other of said sides, a transversely movable mold plate confronting said first mold part in a first molding cycle, said first mold part defining together with said mold plate a first mold cavity into which plasticized thermoplastic material is injected for molding an outer sole, a last supported shoe upper confronting said second mold part in said first molding cycle, a first pair of mold elements laterally movable between closed and opened positions overlying said second mold part and being closed against the shoe upper during said first cycle for defining a sole welt mold cavity into which plasticized thermoplastic material is injected for molding on to the shoe upper a sole welt closed on itself simultaneously with the injection of thermoplastic material for molding the outer sole, a second pair of mold elements laterally movable between closed and opened positions underlying said first pair of mold elements and being open during said first cycle, said first mold part with said molded outer sole confronting the she upper during a second mold cycle upon pivotal movement, said second pair of mold elements being closed during said second cycle to define with the outer sole and the she upper an inner sole cavity into which foam plasticized thermoplastic material is injected for molding an inner sole.

2. An apparatus for molding outer and inner soles and a sole welt on to shoe uppers, comprising a pivotable mold carrier having opposed sides, a first mold part mounted on one of said sides and a second mold part mounted on the other of said sides, first and second transversely movable mold plates alternately confronting said first mold part in a first molding cycle of said carrier, said confronting mold plates respectively defining together with said first mold part first and second portions of an outer sole mold cavity into which plasticized thermoplastic material are separately injected for molding an outer sole in respective first and second injections, a last supported shoe upper confronting said second mold part in said first molding cycle, a first pair of mold elements laterally movable between closed and opened positions overlying said second mold part and being closed against the shoe upper during said first cycle for defining a sole welt mold cavity into which plasticized thermoplastic material is injected for molding on to the shoe upper a sole welt closed on itself simultaneously with the second injection of thermoplastic materials for molding the sole, a second pair of mold elements laterally movable between closed and opened positions underlying said first elements and being open during said first cycle, said first mold part with said molded outer sole confronting the shoe upper during a second molding cycle upon pivotal movement, said second pair of mold elements being closed during said second cycle to define with the outer sole and the shoe upper an inner sole cavity into which foam plasticized thermoplastic material is injected for molding an inner sole.

* * * * *